United States Patent
Jacob et al.

(10) Patent No.: US 12,252,563 B2
(45) Date of Patent: Mar. 18, 2025

(54) ISOBUTYLENE-CONTAINING COMPOSITIONS AND ARTICLES MADE THEREOF

(71) Applicant: ExxonMobil Chemical Patents Inc., Baytown, TX (US)

(72) Inventors: Sunny Jacob, Seabrook, TX (US); Sujith Nair, League City, TX (US); Yuan-Ju Chen, Houston, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 856 days.

(21) Appl. No.: 17/054,953

(22) PCT Filed: May 2, 2019

(86) PCT No.: PCT/US2019/030350
§ 371 (c)(1),
(2) Date: Nov. 12, 2020

(87) PCT Pub. No.: WO2019/221919
PCT Pub. Date: Nov. 21, 2019

(65) Prior Publication Data
US 2021/0246242 A1    Aug. 12, 2021

Related U.S. Application Data

(60) Provisional application No. 62/672,851, filed on May 17, 2018.

(51) Int. Cl.
| | | |
|---|---|---|
| *C08F 212/14* | (2006.01) | |
| *B60C 1/00* | (2006.01) | |
| *C08F 210/10* | (2006.01) | |
| *C08K 3/04* | (2006.01) | |
| *C08K 3/34* | (2006.01) | |

(52) U.S. Cl.
CPC .......... *C08F 212/21* (2020.02); *B60C 1/0008* (2013.01); *C08F 210/10* (2013.01); *C08F 212/18* (2020.02); *C08K 3/04* (2013.01); *C08K 3/346* (2013.01)

(58) Field of Classification Search
CPC .... C08F 212/21; C08F 210/10; C08F 212/18; B60C 1/0008; C08K 3/04; C08K 3/346
See application file for complete search history.

(56) References Cited

U.S. PATENT DOCUMENTS

| | | | |
|---|---|---|---|
| 5,807,629 A | 9/1998 | Elspass et al. | |
| 5,886,106 A | 3/1999 | Sumner et al. | |
| 6,034,164 A | 3/2000 | Elspass et al. | |
| 6,626,219 B2 | 9/2003 | Tracey et al. | |
| 6,960,632 B2 * | 11/2005 | Kaszas | C08F 8/20 525/332.8 |
| 7,241,831 B2 | 7/2007 | Waddell et al. | |
| 7,328,733 B2 | 2/2008 | Tracey et al. | |
| 8,796,378 B2 | 8/2014 | Hara | |
| 2004/0242731 A1 | 12/2004 | Waddell et al. | |
| 2009/0151841 A1 | 6/2009 | Tsou et al. | |
| 2013/0056106 A1 | 3/2013 | Kazuto et al. | |
| 2013/0174933 A1* | 7/2013 | Yamakawa | F16L 11/081 138/137 |

FOREIGN PATENT DOCUMENTS

| | | | | |
|---|---|---|---|---|
| WO | WO-2007051144 A8 * | 1/2008 | | B32B 25/04 |
| WO | 2019/164567 | 8/2019 | | |

OTHER PUBLICATIONS

Exxon butyl and halobutyl rubber: Model vulcanization systems for butyl rubber and halobutyl rubber, ExxonMobilChemical, Dec. 4, 2017, pp. 1-26.

* cited by examiner

*Primary Examiner* — Angela C Scott

(57) ABSTRACT

An elastomer composition can comprise a $C_4$ to $C_7$ isoolefin; a non-halogenated alkylstyrene; a halogenated alkylstyrene; and optionally a diolefin, wherein the $C_4$ to $C_7$ isoolefin is not the same as the diolefin. Optionally, the elastomer composition can be blended with a butyl rubber and/or a halobutyl rubber. Such blends that also comprise additives may be suitable for producing tire components such as innerliners.

18 Claims, No Drawings

ISOBUTYLENE-CONTAINING COMPOSITIONS AND ARTICLES MADE THEREOF

CROSS-REFERENCE TO RELATED APPLICATIONS

This application is a U.S. national phase application of PCT application No. PCT/US2019/030350 having a filing date of May 2, 2019, which claims priority to and the benefit of U.S. provisional application Ser. No. 62/672,851 having a filing date of May 17, 2018, the contents of both of which are incorporated by reference in their entirety.

FIELD OF THE INVENTION

This invention relates to elastomer compositions comprising $C_4$-$C_7$ isoolefin, non-halogenated alkylstyrene, and halogenated styrene that can be blended with halobutyl rubbers for use in tire components such as innerliners.

BACKGROUND OF THE INVENTION

Halobutyl rubbers, which are halogenated isobutylene/isoprene copolymers, are the polymers of choice for best air retention in tires for passenger, truck, bus, and aircraft vehicles. Bromobutyl rubber, chlorobutyl rubber, and halogenated star-branched butyl rubbers can be formulated for specific tire applications, such as tubes or innerliners. The selection of ingredients and additives for the final commercial formulation depends upon the balance of properties desired, namely, processability and tack of the green (uncured) compound in the tire plant versus the in-service performance of the cured tire composite. Examples of these elastomers are butyl (isobutylene-isoprene rubber or IIR), bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene copolymer or BIMSM), etc. The present application focuses on processability of halogenated isoolefin polymers, including BIMSM.

It is known to form conventional tire innerliners using brominated copolymers of isobutylene and para-methylstyrene, and blends of these copolymers with other polymers. See, for example, U.S. Pat. Nos. 5,807,629, and 6,034,164. Halogenated butyl rubbers have proved to be particularly advantageous for adhesion behavior, flexural strength, service life, and for impermeability to air and water. Due to the use of tire innerliners which are based on halogenated butyl rubbers, the tire carcass and the steel or textile cords which are employed in the tire carcass are protected from attack by moisture and oxygen contained in the air used to inflate the innerliner. This has a positive effect on the life of pneumatic tires, including those of highly stressed truck tires. However, improving the physical properties of halogenated butyl rubbers, for example, by increasing the halogen content in the butyl rubber (improving adhesion properties), has not been targeted by tire manufacturers.

The present invention is directed at using halogenated butyl rubbers mixed with at least one other butyl rubber component with dissimilar microstructures due to the disadvantages of using pure halogenated butyl rubbers as the rubber material for innerliners. The inventors surprisingly discovered that the properties of the resulting composition improved, such as aged property retention, aged hardening, crack growth, and flex fatigue.

SUMMARY OF THE INVENTION

A composition can comprise: about 5 parts per hundred parts rubber (phr) to about 95 phr of a halobutyl rubber; and about 5 phr to about 95 phr of an elastomer composition, wherein the elastomer composition comprises: a $C_4$ to $C_7$ isoolefin; a non-halogenated alkylstyrene; and a halogenated alkylstyrene, wherein the non-halogenated alkylstyrene and the halogenated alkylstyrene cumulatively are present in the elastomer composition in the amount of about 3 wt % to about 15 wt % based on the elastomer composition, and wherein the halogenated alkylstyrene is present at from 0.1 mol % to 2 mol % relative to the non-halogenated alkylstyrene. Such compositions can be useful in air barrier articles including tire innerliners.

DETAILED DESCRIPTION

The following language is of the best presently contemplated mode or modes of carrying out the invention. This description is made for the purpose of illustrating the general principles of the invention and should not be taken in a limiting sense. The scope of the invention is best determined by reference to the appended claims.

This invention describes an uncured, filled elastomer composition with processability, a process for making a useful article from the composition, and the useful articles so made. The composition or article in one embodiment an elastomer composition comprising $C_4$-$C_7$ isoolefin, non-halogenated alkylstyrene, halogenated styrene, and optionally a diolefin (wherein the $C_4$ to $C_7$ isoolefin is not the same as the diolefin) that can be blended with halobutyl rubbers and other additives for use in an air barrier (e.g., as an innerliner or innertube).

As used herein, "polymer" may be used to refer to homopolymers, copolymers, interpolymers, terpolymers, etc. As used herein, the term "copolymer" is meant to include polymers having two or more monomers. The term "interpolymer" means any polymer or oligomer having a number average molecular weight of 500 or more prepared by the polymerization or oligomerization of at least two different monomers. As used herein, when a polymer is referred to as "comprising" a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

As used herein, "diolefin" refers to an unsaturated hydrocarbon having at least two unsaturated bonds between carbon atoms. While normally a diolefin will have two double bonds, a molecule with additional double bonds or with one or more triple bond may also function as a diolefin for purposes of this invention. The mere addition of a double or triple bond to a diene does not defeat the improvement of the invention. At the present time the vast majority of possible feedstocks are compounds having only two double bonds. However unsaturated hydrocarbons such as n-1,3,5 hexatriene or n-1,4,6-heptatriene or propyne also meet the requirements to function as a "diolefin" in the context of this invention.

The term "blend" as used herein refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit". Different monomers are discussed herein including, but not limited to, $C_4$-$C_7$ isoolefin monomers, non-halogenated alkylstyrene monomers, halogenated styrene monomers, and diolefin monomers.

As used herein, "phr" means "parts per hundred parts rubber," where the "rubber" is the total rubber content of the composition. Herein, both the elastomer compositions of the present invention and additional rubbers, when present, are considered to contribute to the total rubber content. Thus, for example, a composition having 30 parts by weight of elastomer of the present invention and 70 parts by weight of a second rubber (e.g., butyl rubber) may be referred to as having 30 phr elastomer and 70 phr second rubber. Other components added to the composition are calculated on a phr basis. That is, addition of 50 phr of oil means, for example, that 50 g of oil are present in the composition for every 100 g of total rubber. Unless specified otherwise, phr should be taken as phr on a weight basis.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity determined using a sample weight of 21.5+/−2.7 g in the D1646-17 Section 8 procedures will govern. Finally, the rest procedures before testing set forth in D1646-17 Section 8 are 23+/−3° C. for 30 min in air; Mooney values as reported herein were determined after resting at 24+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C. or ML, 1+8 @ 125° C.), where M is the Mooney viscosity number, L denotes large rotor (defined as ML in ASTM D1646-17), 1 is the pre-heat time in minutes, 4 or 8 is the sample run time in minutes after the motor starts, and 125° C. is the test temperature. Thus, a Mooney viscosity of 90 determined by the aforementioned method would be reported as a Mooney viscosity of 90 MU (ML, 1+8 @ 125° C.) or 90 MU (ML, 1+4 @ 125° C.). Alternatively, the Mooney viscosity may be reported as 90 MU; in such instance, it should be assumed that the just-described (ML, 1+4 @ 125° C.) method is used to determine such viscosity, unless otherwise noted. In some instances, a lower test temperature may be used (e.g., 100° C.), in which case Mooney is reported as Mooney Viscosity (ML, 1+8 @ 100° C.), or @ T° C. where T is the test temperature.

Numerical ranges used herein include the numbers recited in the range. For example, the numerical range "from 1 wt % to 10 wt %" includes 1 wt % and 10 wt % within the recited range.

Elastomer

The composition of the present invention includes an elastomer comprising at least one $C_4$ to $C_7$ isoolefin-derived monomer. The elastomer can be halogenated. Examples of isoolefins that may be used as a $C_4$ to $C_7$ compound include, but are not limited to, isobutylene, isobutene, 2-methyl-1-butene, 3-methyl-1-butene, 2-methyl-2-butene, and 4-methyl-1-pentene. The elastomer also includes at least one non-halogenated alkylstyrene monomer and at least one halogenated alkylstyrene monomer. Examples of non-halogenated alkylstyrene monomers include, but are not limited to, α-methylstyrene, tert-butylstyrene, and styrene units substituted in the ortho, meta, or para position with a $C^1$ to $C_5$ alkyl or branched chain alkyl. In a desirable embodiment, the non-halogenated alkylstyrene monomer is p-methylstyrene. Examples of halogenated alkylstyrene monomers include, but are not limited to, halomethylstyrene and styrene units substituted in the ortho, meta, or para position with a halogenated $C^1$ to $C_5$ alkyl or branched chain alkyl, where the halogen may be chlorine or bromine. In a desirable embodiment, the halogenated alkylstyrene monomer is p-halomethylstyrene, preferably p-bromomethylstyrene or p-chloromethylstyrene.

The elastomers in one embodiment of the invention are random elastomeric copolymers of a $C_4$ to $C_7$ isoolefin (e.g., isobutylene), a non-halogenated alkylstyrene (e.g., p-methylstyrene), and a halogenated alkylstyrene (e.g., p-bromomethylstyrene). The non-halogenated alkylstyrene and halogenated alkylstyrene monomers each can contain at least 80%, more preferably at least 90% by weight of the corresponding para-isomer. Preferred materials may be characterized as interpolymers containing the following monomer units randomly spaced along the polymer chain:

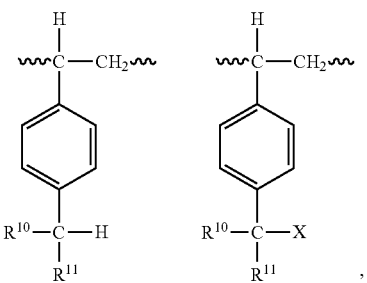

wherein $R^{10}$ and $R^{11}$ are independently hydrogen, lower alkyl, preferably $C_1$ to $C_7$ alkyl, and primary or secondary alkyl halides and X is a functional group such as halogen. Preferably $R^{10}$ and $R^{11}$ are hydrogen. Up to 60 mole percent of the para-substituted styrene present in the interpolymer structure may be a functionalized structure in one embodiment, and in another embodiment from 0.1 to 5 mole percent. In yet another embodiment, the amount of functionalized structure is from 0.4 to 1 mole percent.

The functional group X may be halogen or a combination of a halogen and some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene, p-methylstyrene, and p-bromomethylstyrene where the p-methylstyrene and the p-bromomethylstyrene are present in a combined amount of 0.5 to 20 or 30 weight percent (wt %). These halogenated elastomers are commercially available as EXXPRO™ Elastomers (ExxonMobil Chemical Company, Houston Tex.), and abbreviated as "BIMSM." These elastomers can, if desired, have a substantially homogeneous compositional distribution such that at least 95% by weight of the polymer has a combined the p-methylstyrene and the p-bromomethylstyrene content within 15% of the combined the p-methylstyrene and the p-bromomethylstyrene content of the polymer.

Preferably the elastomer compositions contain from 0.1 to 7.5 mole percent (mol %) of halogenated alkylstyrene derived units relative to the combined non-halogenated and halogenated alkylstyrene derived units in the polymer. For example, the amount of bromomethyl groups is from 0.2 to 3.0 mol %, from 0.3 to 2.8 mol %, from 0.3 to 2.0 mol %, or from 0.4 to 1.0 mol %, wherein a desirable range may be any combination of any upper limit with any lower limit. Expressed another way, preferred copolymers contain from 0.3 to 4.5 wt % of bromine, based on the weight of the polymer, from 0.4 to 4 wt % bromine, and from 0.6 to 1.5 wt % bromine. In one embodiment of the invention, the interpolymer is a copolymer of $C_4$ to $C_7$ isoolefin derived units (or isomonoolefin), p-methylstyrene derived units, and p-halomethylstyrene derived units, wherein the p-halomethylstyrene units are present in the interpolymer from 0.4 to 1.0 mol % based on the total number of p-methylstyrene and p-halomethylstyrene derived units, and wherein the p-methylstyrene derived units are present from 3 wt % to 15 wt % based on the total weight of the polymer, or from 10 wt % to 12 wt %. The p-halomethylstyrene can be, for example, p-bromomethylstyrene.

Optionally, the elastomer compositions can further comprise one or more diolefin monomers, wherein the $C_4$ to $C_7$ isoolefin is not the same as the diolefin. Examples of diolefins include, but are not limited to, isoprene; cis-1,3-pentadiene; trans-1,3-pentadiene; cyclopentene; cyclopentadiene, beta-pinene, limonene, and combinations thereof.

The diene monomers can be present in the elastomer composition in an amount of 0.5 wt % to 10 wt % of the polymer, or 1 wt % to 8 wt %, or 2 wt % to 5 wt %.

Example elastomer compositions can include at least one $C_4$ to $C_7$ isoolefin-derived monomer (e.g., isobutylene), at least one non-halogenated alkylstyrene-derived monomer (e.g., p-methylstyrene), at least one halogenated alkylstyrene-derived monomer (e.g., p-bromomethylstyrene), and at least one diene-derived monomer (e.g., isoprene). For example, the at least one $C_4$ to $C_7$ isoolefin-derived monomer can be present at about 60 wt % to about 99 wt %, the at least one non-halogenated alkylstyrene-derived monomer and at least one halogenated alkylstyrene-derived monomer cumulatively can be present at about 0.5 wt % to about 30 wt % with the at least one halogenated alkylstyrene-derived monomer being 0.1 mol % to 7.5 mol % of the combined content of the at least one non-halogenated alkylstyrene-derived monomer and the at least one halogenated alkylstyrene-derived monomer, and the at least one diene-derived monomer can be present at about 0.5 wt % to about 10 wt %.

In accordance with the invention, the elastomer has a (ML, 1+8 @ 100° C.) Mooney viscosity less than 65, for example, 20 to 60, 25 to 50, 30 to 45, or 32 to 37.

Desirable interpolymers can also be characterized by a narrow molecular weight distribution ($M_w/M_n$) of less than 5, more preferably less than 2.5.

The interpolymers can also be characterized by a preferred viscosity average molecular weight in the range of from 2,000 up to 2,000,000 and a preferred number average molecular weight in the range of from 2500 to 750,000 as determined by gel permeation chromatography. In particular embodiments it may be preferable to utilize two or more interpolymers having a similar backbone, such as a low molecular weight interpolymer having a weight average molecular weight less than 150,000 can be blended with a high molecular weight interpolymer having a weight average molecular weight greater than 250,000, for example.

In an embodiment, the polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety. In an embodiment, the polymers may be prepared by directly functionalizing with different functional moiety without a bromination step.

Fillers and Other Additives

The compositions of the invention may also optionally include one or more filler components such as calcium carbonate, clay, mica, silica and silicates, talc, titanium dioxide, and carbon black. As used herein, fillers can include inorganic clay and/or organoclay particles. In one embodiment, the filler is carbon black or modified carbon black. The filler is semi-reinforcing grade carbon black present at a level of from 10 to 150 phr of the blend, more preferably from 30 to 120 phr, and especially from 35 to 100 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037-93, D1510-17, and D3765-04). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

Other possible fillers to be added to the elastomer include nano-sized talcs. Such talcs have a very high surface area in comparison to conventional sized talc platelets. The nano-sized talcs have a maximum dimension in the 100 to 200 nm range.

In another embodiment of the invention, improved interpolymer impermeability is achieved by the presence of at least one polyfunctional curative. An embodiment of such polyfunctional curatives can be described by the formula Z—$R^{17}$—Z, wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (D. R. Smith, ed., Lippincott & Petto Inc. 2001). The polyfunctional curative, if present, may be present in the composition from 0.1 to 8 phr in one embodiment, and from 0.2 to 5 phr in yet another embodiment.

The addition of fillers such as calcium carbonate, clay, mica, silica and silicates, talc, titanium dioxide, and carbon black raises the Mooney viscosity of the elastomer from the starting value of less than 60 to a level comparable to the Mooney viscosity of commercial elastomers often used in manufacturing air impermeable rubber compounds.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: PERMALUX™ (di-ortho-tolylguanidine salt of dicatechol borate, available from DuPont), HVA-2™ (m-phenylene bis maleimide, available from DuPont), ZISNET™ (2, 4, 6-trimercapto-5 triazine, available from Sankyo-Kasei), ZDEDC (zinc diethyl dithiocarbamate) and other dithiocarbamates, TETRONE™ A (dipenta-methylene thiuram hexasulfide, available from DuPont), VULTAC™ 5 (alkylated phenol disulfide, available from Arkema), SP1045™ (phenol formaldehyde resin, available from Akrochem), SP1056™ (brominated alkyl phenol formaldehyde resin, available from Akrochem), DPPD (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the composition of the present invention in any suitable mixing device such as a BANBURY™ mixer, BRABENDER™ mixer or preferably a mixer/extruder and mixing at temperatures in the range of 120° C. up to 300° C. under conditions of shear sufficient to allow the components to become uniformly dispersed within the polymer to form the composition.

Composition Properties

The elastomers and blends thereof have an improved air impermeability, such as having an oxygen transmission rate of 0.300 (mm)•(cc)/[$m^2$•day•mmHg] at 40° C. or lower as measured on compositions or articles as described herein (e.g., air barrier articles comprising the elastomer and/or blends comprising the elastomer described herein). Alternatively, the oxygen transmission rate is 0.295 (mm)•(cc)/[$m^2$•day•mmHg] at 40° C. or lower as measured on compositions as described herein; the oxygen transmission rate is 0.290 (mm)•(cc)/[$m^2$•day•mmHg] at 40° C. or lower as measured on compositions as described herein; the oxygen transmission rate is 0.280 (mm)•(cc)/[$m^2$•day•mmHg] at 40° C. or lower as measured on compositions as described herein; the oxygen transmission rate is 0.270 (mm)•(cc)/[$m^2$•day•mmHg] at 40° C. or lower as measured on compositions as described herein; the oxygen transmission rate is 0.260 (mm)•(cc)/[$m^2$•day•mmHg] at 40° C. or lower as measured on compositions as described herein; the oxygen transmission rate is 0.250 (mm)•(cc)/[$m^2$•day•mmHg] at 40° C. or lower as measured on compositions as described herein; or the oxygen transmission rate is 0.240 (mm)•(cc)/[$m^2$•day•mmHg] at 40° C. or lower as measured on compositions as described herein. For example, the composition formed results in an improved air impermeability of the composition, such as having an oxygen transmission rate of 0.200 (mm)•(cc)/[$m^2$•day•mmHg] to 0.300 (mm)•(cc)/[$m^2$•day•mmHg] at 40° C. or 0.220 (mm)•(cc)/[$m^2$•day•mmHg] to 0.270 (mm)•(cc)/[$m^2$•day•mmHg] at 40° C. as measured on compositions or articles as described herein.

The elastomers and blends thereof have an improved glass transition temperature (Tg) as measured by Dynamic Mechanical Thermal Analysis (DMTA). The elastomers can have a Tg (determined from the tan delta peak) of about −35° C. to about −30° C. Blends of the elastomers and a secondary rubber have a reduced Tg by about 2° C. to about 4° C. (i.e., about −39° C. to about −32° C.).

Secondary Rubber Component

A secondary rubber or general purpose rubber" component may be blended with the disclosed compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; other poly(isobutylene-co-p-methylstyrene) and halogenated poly(isobutylene-co-p-methylstyrene) elastomers, such as, for example, terpolymers of isobutylene derived units, p-methylstyrene derived units, and p-bromomethylstyrene derived units that have monomer contents, molecular weights, Mooney viscosities, chain branching indices or other properties not meeting the above BIMSM specifications, and mixtures thereof. Many of these rubbers are described by Subramaniam in RUBBER TECHNOLOGY 179-208 (M. Morton, Chapman & Hall 1995), THE VANDERBILT RUBBER HANDBOOK 105-122 (R. F. Ohm ed., R.T. Vanderbilt Co., Inc. 1990), or E. Kresge and H. C. Wang in 8 KIRK-OTHMER ENCYCLOPEDIA OF CHEMICAL TECHNOLOGY 934-955 (John Wiley & Sons, Inc. 4th ed. 1993).

A desirable embodiment of the secondary rubber component present is natural rubber. Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D1646-17.

Polybutadiene rubber (BR) is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. A desirable rubber is high cis-polybutadiene (cis-BR). By "cis-polybutadiene" or "high cis-polybutadiene," it is meant that 1,4-cis polybutadiene is used, wherein the amount of cis component is at least 95%. An example of a high cis-polybutadiene commercial product used in the composition is BUDENE™ 1207 (available from Goodyear Chemical).

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. A suitable ethylene-propylene rubber is commercially available as VISTALON™ (ExxonMobil Chemical Company).

In another embodiment, the secondary rubber is a halogenated rubber as part of the terpolymer composition. The halogenated butyl rubber is brominated butyl rubber, and in another embodiment is chlorinated butyl rubber.

The secondary rubber component of the present invention includes, but is not limited to, at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

The halogenated elastomer useful as the secondary rubber in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber. In one embodiment, the halogenated butyl rubber is brominated butyl rubber, and in another embodiment is chlorinated butyl rubber.

The halogenated rubber component of the present invention includes, but is not limited to, brominated butyl rubber, chlorinated butyl rubber, star-branched brominated butyl (polyisobutylene/isoprene copolymer) rubber; isobutylene-bromomethylstyrene copolymers such as isobutylene/meta-bromomethylstyrene, isobutylene/p-bromomethylstyrene, isobutylene/chloromethylstyrene, halogenated isobutylene cyclopentadiene, and isobutylene/p-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In another embodiment, the halogenated butyl or star-branched butyl rubber used as the secondary rubber component may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963, 4,649,178, and 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

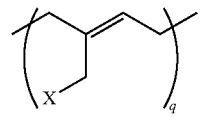

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber used as the secondary rubber component of the present invention is Bromobutyl 2222 (ExxonMobil Chemical Company). Its Mooney viscosity is from 27 to 37 (ML 1+8 at 125° C., ASTM 1646-17), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 18 dN·m (ASTM D2084-17). Another commercial embodiment of the halogenated butyl rubber used as the secondary rubber component is Bromobutyl 2255 (ExxonMobil Chemical Company). Its Mooney viscosity is from 41 to 51 (ML 1+8 at 125° C., ASTM 1646-17), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084-17). The invention is not limited to the commercial source of any of the halogenated rubber components. Examples of non-halogenated and halogenated rubbers are provided in Table 1 all available from ExxonMobil Chemical Company, where the balance of the composition is isobutylene.

TABLE 1

Exemplary Isobutylene Based Polymers

| Elastomer | Mooney Viscosity (ML1 + 8 @ 125° C.) | Isoprene (mol. %) | Para-Methyl-styrene (wt. %) | Halogen | Halogen (wt. %) | Halogen (mol. %) |
|---|---|---|---|---|---|---|
| EXXON™ BUTYL 065 | 32 | 1.05 | — | — | — | — |
| EXXON™ BUTYL 365 | 33 | 2.30 | — | — | — | — |
| EXXON™ BUTYL 068 | 51 | 1.15 | — | — | — | — |
| EXXON™ BUTYL 268 | 51 | 1.70 | — | — | — | — |
| EXXON™ CHLORO-BUTYL 1066 | 38 | 1.95 | — | Cl | 1.26 | — |
| EXXON™ BROMO-BUTYL 222 | 32 | 1.70 | — | Br | 2.00 | — |
| EXXON™ BROMO-BUTYL 2235 | 39 | 1.70 | — | Br | 2.00 | — |
| EXXON™ BROMO-BUTYL 2255 | 46 | 1.70 | — | Br | 2.00 | — |
| EXXON™ BROMO-BUTYL 2211 | 32 | 1.70 | — | Br | 2.10 | — |
| EXXON™ BROMO-BUTYL 2244 | 46 | 1.70 | — | Br | 2.10 | — |
| EXXON™ BROMO-BUTYL 7211 | 32 | 1.70 | — | Br | 2.00 | — |
| EXXON™ BROMO-BUTYL 7244 | 46 | 1.7 | — | Br | 2.00 | — |
| EXXON™ BROMO-BUTYL 6222 | 32 | 1.70 | — | Br | 2.40 | — |
| EXXON™ CHLORO-BUTYL 5066 | 32 | — | — | Cl | 1.26 | — |
| EXXPRO® 3035 | 45 | — | 5.00 | Br | — | 0.47 |
| EXXPRO® 3433 | 35 | — | 5.00 | Br | — | 0.75 |
| EXXPRO® 3745 | 45 | — | 7.50 | Br | — | 1.20 |

In embodiments where the elastomer compositions of the present invention are mixed with secondary rubbers to produce compositions of the invention, the elastomer composition(s) can be present at about 5 phr to about 95 phr, and the secondary rubber(s) can be present at about 5 phr to about 95 phr. For example, the elastomer composition(s) can be present at about 5 phr to about 75 phr, and the secondary rubber(s) can be present at about 25 phr to about 95 phr. In another example, the elastomer composition(s) can be present at about 5 phr to about 50 phr, and the secondary rubber(s) can be present at about 50 phr to about 95 phr. In another example, the elastomer composition(s) can be present at about 10 phr to about 30 phr, and the secondary rubber(s) can be present at about 70 phr to about 90 phr. In another example, the elastomer composition(s) can be present at about 25 phr to about 95 phr, and the secondary rubber(s) can be present at about 5 phr to about 75 phr. In another example, the elastomer composition(s) can be present at about 50 phr to about 95 phr, and the secondary rubber(s) can be present at about 5 phr to about 50 phr. In another example, the elastomer composition(s) can be present at about 70 phr to about 90 phr, and the secondary rubber(s) can be present at about 10 phr to about 30 phr.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, air spring sleeves, and automotive (including truck, commercial and/or passenger) or aircraft innerliners and innertubes. Other useful goods that can be made using compositions of the invention include hoses, seals, belts, molded goods, cable housing, and other articles disclosed in THE VANDERBILT RUBBER HANDBOOK, p 637-772 (R. F. Ohm, ed., R.T. Vanderbilt Company, Inc. 1990).

Suitable elastomeric compositions for such articles as air barriers, and more particularly tire curing bladders, innerliners, tire innertubes, and air sleeves, including gaskets and ring structures, were prepared by using conventional mixing techniques such as with a Banbury™ mixer. The sequence of mixing and temperatures employed are well known to the skilled rubber compounder, the objective being the dispersion of fillers, activators and curatives in the polymer matrix without excessive heat buildup.

A useful mixing procedure utilizes the BANBURY™ mixer with tangential rotors in which the elastomer and additional components, such as carbon black, clay, or plasticizer, are added and the composition mixed for the desired time or to a particular temperature to achieve adequate dispersion of the ingredients. Mixing is performed at temperatures in the range from the melting point of the elastomer and/or any secondary rubber used in the composition in one embodiment, from 40° C. up to 250° C. in another embodiment, and from 100° C. to 200° C. in yet another embodiment. Typically, from 70% to 100% of the elastomer or elastomers is first mixed for 20 to 90 seconds, or until the temperature reaches from 40° C. to 75° C. Then, ¾ of any filler, and the remaining amount of elastomer, if any, are typically added to the mixer, and mixing continues until the temperature reaches from 90° C. to 150° C. Next, any remaining filler is added, as well as the processing aid, and mixing continues until the temperature reaches from 140° C. to 190° C. The masterbatch mixture is then finished by sheeting on an open mill and allowed to cool, for example, to from 60° C. to 100° C. when the curatives are added.

If the compounded rubber is to be used as an innerliner for a tire, innerliner stock is then prepared by calendaring the compounded rubber into a sheet material having a thickness of roughly 1 to 2 mm (40 to 80 mil gauge) and cutting the sheet material into strips of appropriate width for innerliner applications. The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. A pneumatic tire is a layered laminate having an outer surface which includes the tread and sidewall elements, belt reinforcing layers radially inward of the tread, an intermediate carcass structure which comprises a number of plies containing tire reinforcing fibers, (e.g., rayon, polyester, nylon or metal fibers) embedded in a rubbery matrix with the ends thereof typically turned about a pair of non-extensible bead rings, and an innerliner which is laminated to the inner surface of the carcass structure. Tires are normally built on a tire building drum, in either a single or two stage building process. After the uncured green tire has been assembled, the uncured tire is placed in a heated mold having an inflatable bladder that expands into the interior of the tire and contacts the tire innerliner. The tire is then heated to vulcanization temperatures to cure the tire. Vulcanization temperatures generally range from about 100° C. to about 250° C., more preferably from 125° C. to 200° C., and times may range from about one minute to several hours, more preferably from about 5 to 30 minutes for passenger car tires. Vulcanization time and temperature is dependent on multiple factors, including tire size, thickness of the tire, and the elastomers used in the tire. Vulcanization of the assembled tire results in vulcanization of the elastomeric elements of the tire assembly and enhances the adhesion between these elements, resulting in a cured, unitary tire.

EXAMPLE EMBODIMENTS

Example 1. An elastomer composition comprising: a C4 to C7 isoolefin; a non-halogenated alkylstyrene; and a halogenated alkylstyrene.

Example 2. The elastomer composition of Example 1 further comprising: a diolefin, wherein the C4 to C7 isoolefin is not the same as the diolefin.

Example 3. The elastomer composition of Example 2, wherein the diolefin is isoprene, butadiene, cyclopentadiene, or combinations thereof.

Example 4. The elastomer composition of Example 2 or 3, wherein the diolefin is present in the elastomer composition in the amount of less than or equal to about 10 wt % based on the elastomer composition.

Example 5. The elastomer composition of any preceding Example, wherein the C4 to C7 isoolefin is halogenated.

Example 6. The elastomer composition of any preceding Example, wherein the C4 to C7 isoolefin is halogenated with bromine.

Example 7. The elastomer composition of any preceding Example, wherein the non-halogenated alkylstyrene is p-methylstyrene.

Example 8. The elastomer composition of any preceding Example, wherein the non-halogenated alkylstyrene and the halogenated alkylstyrene cumulatively are present in the elastomer composition in the amount of greater than or equal to about 10 wt % based on the elastomer composition.

Example 9. The elastomer composition of any preceding Example, wherein the halogenated alkylstyrene is present at from 0.1 mol % to 7.5 mol % relative to the non-halogenated alkylstyrene.

Example 10. The elastomer composition of any preceding Example, wherein the C4 to C7 isoolefin is present in the elastomer composition in the amount of less than or equal to about 90 wt % based on the elastomer composition.

Example 11. An article comprising the elastomer composition of any one of Examples 1-10.

Example 12. A tire innerliner comprising the composition of any one of Examples 1-10.

Example 13. A tire comprising the tire innerliner of Example 12.

Example 14. A composition comprising: about 5 parts per hundred parts rubber (phr) to about 95 phr of the elastomer composition of any one of Examples 1-10; and about 5 phr to about 95 phr of a halobutyl rubber.

Example 15. The composition of Example 14, wherein the halobutyl rubber is selected from the group consisting of: bromobutyl rubber, chlorobutyl rubber, and combinations thereof.

Example 16. The composition of Example 14 or 15, wherein the halobutyl rubber is selected from the group consisting of: brominated isobutylene-isoprene rubber, chlorinated isobutylene-isoprene rubber, brominated isobutylene-co-p-methylstyrene copolymer, and combinations thereof.

Example 17. The composition of any one of Examples 14-16 further comprising: processing aid; curative; and filler.

Example 18. A process to make the composition of any one of Examples 14-17, comprising the steps of: a. polymerizing in a first reactor the C4 to C7 isoolefin, the non-halogenated alkylstyrene, the halogenated alkylstyrene, optionally the diolefin, and optionally the isobutylene-p-methylstyrene; b. polymerizing in a second reactor monomers of the halobutyl rubber; c. combining product streams from the first and second reactors to produce a blend; and d. optionally combining the blend with the processing aid, the curative, and the filler.

Example 19. A process to make the composition of any one of Examples 14-17, comprising the steps of: a. polymerizing in a first reactor the C4 to C7 isoolefin, the non-halogenated alkylstyrene, the halogenated alkylstyrene, optionally the diolefin, and optionally the isobutylene-p-methylstyrene to produce the elastomer composition; b. polymerizing in a second reactor monomers of the halobutyl rubber to produce the halobutyl rubber; and c. optionally combining the elastomer composition, the halobutyl rubber, optionally the processing aid, optionally the curative, and optionally the filler.

Example 20. The composition of Example 17, wherein the filler is carbon black and present at about 20 to about 100 phr.

Example 21. The composition of Example 17, wherein the filler is clay and present at about 1 to about 30 phr.

Example 22. An article comprising the composition of any one of Examples 14-17 or 20-21.

Example 23. A tire innerliner comprising the composition of any one of Examples 14-17 or 20-21.

Example 24. A tire comprising the tire innerliner of claim 23.

To facilitate a better understanding of the embodiments of the present invention, the following examples of preferred or representative embodiments are given. In no way should the following examples be read to limit, or to define, the scope of the invention.

Example 1

Three elastomers of the present invention (Butyl polymers B-D) and a secondary rubber (Butyl polymer A) of the invention were produced according to the compositions and properties of Table 2.

TABLE 2

Polymer Compositions and Properties*

| Polymer type | Mooney viscosity, ML1 + 8 @ 125 C. | Isoprene content, mol % | PMS + b-PMS content, wt % | b-PMS, mol % of PMS + b-PMS content | Isobutylene |
|---|---|---|---|---|---|
| Butyl polymer A | 32 | 1.7 | 0 | 1.03 | balance |
| Butyl polymer B | 35 | 0 | 5 | 0.75 | balance |
| Butyl polymer C | 45 | 0 | 7.5 | 1.2 | balance |
| Butyl polymer D | 33.6 | 0 | 10 | 0.84 | balance |

Compounds/blends of the invention were produced using the polymers in Table 1 according to the formulations in Tables 3 and 4. The properties of the formulations are also provided in Tables 3 and 4.

TABLE 3

Compound Formulations and Properties
Components (phr)

| Sample | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| N660 | 60 | 60 | 60 | 60 | 60 | 60 | 60 | 60 | 60 | 60 | 60 | 60 |
| CALSOL ™ 810 (high VGC process oil, available from RE Carroll) | 8 | 8 | 8 | 8 | 8 | 8 | 8 | 8 | 8 | 8 | 8 | 8 |
| STRUKTOL ™ 40 MS (mixture of aromatic and aliphatic hydrocarbon resins, available from Struktol) | 7 | 7 | 7 | 7 | 7 | 7 | 7 | 7 | 7 | 7 | 7 | 7 |
| stearic acid | 1 | 1 | 1 | 1 | 1 | 1 | 1 | 1 | 1 | 1 | 1 | 1 |
| ESCOREZ ™ 1102 (hydrocarbon polymer additive, available from ExxonMobil Chemical Company) | 4 | 4 | 4 | 4 | 4 | 4 | 4 | 4 | 4 | 4 | 4 | 4 |
| magnesium oxide | 0.15 | 0.15 | 0.15 | 0.15 | 0.15 | 0.15 | 0.15 | 0.15 | 0.15 | 0.15 | 0.15 | 0.15 |
| Butyl polymer A | 100 | 90 | 80 | 70 | 60 | 90 | 80 | 70 | 90 | 80 | 70 | |
| Butyl polymer B | | 10 | 20 | 30 | 40 | | | | | | | |
| Butyl polymer C | | | | | | 10 | 20 | 30 | | | | |
| Butyl polymer D | | | | | | | | | 10 | 20 | 30 | 100 |
| Pass #1 Total phr | 180.15 | 180.15 | 180.15 | 180.15 | 180.15 | 180.15 | 180.15 | 180.15 | 180.15 | 180.15 | 180.15 | 180.15 |
| zinc oxide | 1 | 1 | 1 | 1 | 1 | 1 | 1 | 1 | 1 | 1 | 1 | 1 |
| ALTAX ™ (oil-filled accelerator MBTS, available from Vanderbilt Chemicals) | 1.25 | 1.25 | 1.25 | 1.25 | 1.25 | 1.25 | 1.25 | 1.25 | 1.25 | 1.25 | 1.25 | 1.25 |
| sulfur | 0.5 | 0.5 | 0.5 | 0.5 | 0.5 | 0.5 | 0.5 | 0.5 | 0.5 | 0.5 | 0.5 | 0.5 |
| Total phr | 182.9 | 182.9 | 182.9 | 182.9 | 182.9 | 182.9 | 182.9 | 182.9 | 182.9 | 182.9 | 182.9 | 182.9 |

Mooney ML(1 + 8) on MV2000E ASTM 1646-17

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test temp [° C.] | 100 | 100 | 100 | 100 | 100 | 100 | 100 | 100 | 100 | 100 | 100 | 100 |
| Test time [min] | 8 | 8 | 8 | 8 | 8 | 8 | 8 | 8 | 8 | 8 | 8 | 8 |
| Preheat [min] | 2 | 2 | 2 | 2 | 2 | 2 | 2 | 2 | 2 | 2 | 2 | 2 |
| Mn [MU] | 56.6 | 59 | 57.7 | 60 | 59.2 | 58.2 | 59.5 | 60.5 | 57.3 | 58.1 | 58 | 61.2 |
| Visc@4 [MU] | 57.7 | 60 | 58.6 | 60.6 | 60 | 59.1 | 60.6 | 61.4 | 58.3 | 59.1 | 58.7 | 61.4 |

TABLE 3-continued

Compound Formulations and Properties
Components (phr)

Mooney Scorch on MV2000E ASTM 1646-17

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test temp [° C.] | 125 | 125 | 125 | 125 | 125 | 125 | 125 | 125 | 125 | 125 | 125 | 125 |
| Test time [min] | 60 | 60 | 60 | 60 | 60 | 60 | 60 | 60 | 60 | 60 | 60 | 60 |
| Preheat [min] | 1 | 1 | 1 | 1 | 1 | 1 | 1 | 1 | 1 | 1 | 1 | 1 |
| Mm [MU] | 22.4 | 23.7 | 23.1 | 24.1 | 23.7 | 23.4 | 24.1 | 24.4 | 22.6 | 22.9 | 22.6 | 23.7 |
| t1 [min] | 27.75 | 31.32 | 29.82 | 35.88 | 42.23 | 34.83 | 35.88 | 34.37 | 35.37 | 36.35 | 40.32 | 32.2 |
| t2 [min] | 42.72 | 45.55 | 47.35 | 49.35 | 59.83 | 45.8 | 48.42 | 47.83 | 47.87 | 51.35 | 52.92 | " |

MDR ASTM 5289-17

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test Time [min] | 60 | 60 | 60 | 60 | 60 | 60 | 60 | 60 | 60 | 60 | 60 | 60 |
| Test Temp [° C.] | 160 | 160 | 160 | 160 | 160 | 160 | 160 | 160 | 160 | 160 | 160 | 160 |
| Osc. angle [Deg.] | 0.5 | 0.5 | 0.5 | 0.5 | 0.5 | 0.5 | 0.5 | 0.5 | 0.5 | 0.5 | 0.5 | 0.5 |
| ML [dNm] | 1.23 | 1.33 | 1.28 | 1.31 | 1.28 | 1.3 | 1.36 | 1.4 | 1.27 | 1.26 | 1.25 | 1.17 |
| MH [dNm] | 4.81 | 5.34 | 5.49 | 5.77 | 5.88 | 5.46 | 5.88 | 6.54 | 5.23 | 5.42 | 5.54 | 5.32 |
| MH-ML [dNm] | 3.58 | 4.01 | 4.21 | 4.46 | 4.6 | 4.16 | 4.52 | 5.14 | 3.96 | 4.16 | 4.29 | 4.15 |
| t10 [min] | 2.86 | 3.22 | 3.62 | 3.79 | 4 | 3.26 | 3.43 | 3.93 | 3.3 | 3.37 | 3.6 | 4.93 |
| t50 [min] | 8.43 | 9.21 | 9.74 | 10.31 | 11.35 | 9.34 | 9.27 | 9.9 | 9.16 | 9.47 | 9.98 | 16.1 |
| t90 [min] | 16.06 | 16.89 | 17.6 | 18.39 | 20.17 | 17.24 | 16.48 | 18.03 | 17.01 | 17.19 | 18.28 | 34.3 |
| PeakRate [dNm/min] | 0.35 | 0.36 | 0.37 | 0.37 | 0.35 | 0.38 | 0.45 | 0.45 | 0.37 | 0.37 | 0.35 | 0.24 |

MDR ASTM 5289-17

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test Time [min] | 30 | 30 | 30 | 30 | 30 | 30 | 30 | 30 | 30 | 30 | 30 | 30 |
| Test Temp [° C.] | 180 | 180 | 180 | 180 | 180 | 180 | 180 | 180 | 180 | 180 | 180 | 180 |
| Osc. angle [Deg.] | 0.5 | 0.5 | 0.5 | 0.5 | 0.5 | 0.5 | 0.5 | 0.5 | 0.5 | 0.5 | 0.5 | 0.5 |
| ML [dNm] | 1.05 | 1.08 | 1.05 | 1.05 | 1.03 | 1.09 | 1.15 | 1.14 | 1.05 | 1.01 | 1.01 | 0.89 |
| MH [dNm] | 4.69 | 5.16 | 5.39 | 5.62 | 5.69 | 5.42 | 5.82 | 6.46 | 5.13 | 5.28 | 5.42 | 4.99 |
| MH-ML [dNm] | 3.64 | 4.08 | 4.34 | 4.57 | 4.66 | 4.33 | 4.67 | 5.32 | 4.08 | 4.27 | 4.41 | 4.1 |
| t10 [min] | 1.16 | 1.26 | 1.35 | 1.41 | 1.53 | 1.27 | 1.31 | 1.44 | 1.25 | 1.3 | 1.38 | 2.01 |
| t50 [min] | 2.52 | 2.74 | 2.87 | 3 | 3.26 | 2.83 | 2.77 | 3 | 2.7 | 2.82 | 2.92 | 4.46 |
| t90 [min] | 4.42 | 4.66 | 4.83 | 5.06 | 5.5 | 4.83 | 4.64 | 5.11 | 4.64 | 4.79 | 4.93 | 9.43 |
| PeakRate [dNm/min] | 1.3 | 1.34 | 1.39 | 1.41 | 1.32 | 1.38 | 1.59 | 1.65 | 1.35 | 1.36 | 1.38 | 0.86 |

TABLE 3-continued

Compound Formulations and Properties
Components (phr)

Hardness Shore A (Zwick)
ASTM 2240-15e1

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Aged 3.0 days/125° C./Cured @ 160° C. | | | | | | | | | | | | |
| Test Delay (3 sec) [sec] | 3 | 3 | 3 | 3 | 3 | 3 | 3 | 3 | 3 | 3 | 3 | 3 |
| Test Temp. [° C.] | 23 | 23 | 23 | 23 | 23 | 23 | 23 | 23 | 23 | 23 | 23 | 23 |
| Hardness A [Shore A] | 58 | 58 | 59 | 58 | 59 | 59 | 61 | 60 | 58 | 58 | 59 | 62 |

Hardness Shore A (Zwick) ASTM 2240-15e1
Unaged Cured @ 160° C.

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test Delay (3 sec) [sec] | 3 | 3 | 3 | 3 | 3 | 3 | 3 | 3 | 3 | 3 | 3 | 3 |
| Test Temp. [° C.] | 23 | 23 | 23 | 23 | 23 | 23 | 23 | 23 | 23 | 23 | 23 | 23 |
| Hardness A [Shore A] | 42 | 44 | 45 | 46 | 46 | 42 | 45 | 47 | 42 | 44 | 46 | 48 |

Hardness Shore A (Zwick) ASTM 2240-15e1
Aged 3.0 days/125° C./Cured @ 175° C.

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test Delay (3 sec) [sec] | 3 | 3 | 3 | 3 | 3 | 3 | 3 | 3 | 3 | 3 | 3 | 3 |
| Test Temp. [° C.] | 23 | 23 | 23 | 23 | 23 | 23 | 23 | 23 | 23 | 23 | 23 | 23 |
| Hardness A [Shore A] | 56 | 54 | 55 | 57 | 55 | 57 | 59 | 61 | 56 | 57 | 57 | 62 |

ASTM 2240-15e1
Unaged Cured @ 175° C.

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Test Delay (3 sec) [sec] | 3 | 3 | 3 | 3 | 3 | 3 | 3 | 3 | 3 | 3 | 3 | 3 |
| Test Temp. [° C.] | 23 | 23 | 23 | 23 | 23 | 23 | 23 | 23 | 23 | 23 | 23 | 23 |
| Hardness A [Shore A] | 36 | 41 | 43 | 42 | 42 | 43 | 43 | 4 | 40 | 41 | 43 | 47 |

Tensile Test
ASTM D412-16 Cured @ 160° C.
Aged 3.0 days/125° C. Cured @ 160° C.

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| 100 Modulus [MPa] | 2.236 | 2.37 | 2.295 | 2.453 | 2.582 | 2.592 | 3.047 | 3.433 | 2.213 | 2.44 | 2.67 | 2.803 |
| 300 Modulus [MPa] | 6.142 | 6.525 | 6.388 | 6.76 | 7.092 | 6.88 | 7.533 | 8.47 | 6.201 | 6.408 | 6.638 | 6.82 |
| Energy To Break [J] | 9.5 | 9.918 | 10.172 | 10.595 | 10.992 | 7.438 | 7.867 | 7.691 | 9.991 | 10.336 | 11.134 | 12.589 |
| Stress At Break [MPa] | 8.717 | 9.086 | 9.154 | 9.253 | 9.667 | 8.722 | 8.95 | 9.586 | 8.919 | 8.885 | 9.012 | 9.796 |
| % Strain At Break [%] | 589.96 | 588.53 | 572.67 | 567.37 | 600.62 | 471.26 | 446.85 | 418.85 | 608.83 | 588.03 | 600.39 | 657.77 |

ASTM D412-16
Unaged Cured @ 160° C.

TABLE 3-continued

Compound Formulations and Properties
Components (phr)

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| 100Modulus [MPa] | 0.982 | 1.186 | 1.196 | 1.27 | 1.385 | 1.242 | 1.488 | 1.764 | 1.12 | 1.181 | 1.405 | 1.459 |
| 300Modulus [MPa] | 3.36 | 4.093 | 4.186 | 4.348 | 4.661 | 4.385 | 4.818 | 5.562 | 3.94 | 4.077 | 4.501 | 4.127 |
| Energy To Break [J] | 12.066 | 11.214 | 12.701 | 12.675 | 13.186 | 10.316 | 12.97 | 11.955 | 11.555 | 12.101 | 13.151 | 12.841 |
| Stress At Break [MPa] | 10.043 | 9.871 | 9.899 | 9.901 | 10.131 | 9.358 | 9.911 | 9.786 | 9.666 | 9.403 | 9.386 | 8.669 |
| % Strain At Break [%] | 818.9 | 747.15 | 754.22 | 755.93 | 798.36 | 705.73 | 774.769 | 693.995 | 781.129 | 770.865 | 785.144 | 855.509 |

Aged 3.0 days/125° C. Cured @ 175° C.
ASTM D412-16

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| 100Modulus [MPa] | 1.885 | 2.034 | 2.259 | 2.4 | 2.377 | 2.478 | 2.913 | 3.008 | 2.131 | 2.22 | 2.378 | 2.733 |
| 300Modulus [MPa] | 5.336 | 5.965 | 6.348 | 6.689 | 6.878 | 6.757 | 7.319 | 8.058 | 5.742 | 5.858 | 6.17 | 6.715 |
| Energy To Break [J] | 7.724 | 7.705 | 7.864 | 9.05 | 9.68 | 7.625 | 7.521 | 7.604 | 8.438 | 9.287 | 9.099 | 12.802 |
| Stress At Break [MPa] | 7.743 | 7.997 | 8.158 | 8.805 | 9.296 | 8.373 | 8.685 | 9.495 | 8.101 | 8.297 | 8.334 | 9.941 |
| % Strain At Break [%] | 565.66 | 529.33 | 510.6 | 547.19 | 544.88 | 485.5 | 444.79 | 431.75 | 572.39 | 570.27 | 566.44 | 659.87 |

Tensile Test
Unaged Cured @ 175° C.
ASTM D412-16

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| 100Modulus [MPa] | 0.847 | 0.983 | 1.072 | 1.192 | 1.168 | 1.075 | 1.31 | 1.506 | 1.002 | 1.053 | 1.154 | 1.346 |
| 300Modulus [MPa] | 2.954 | 3.603 | 3.72 | 4.236 | 4.121 | 3.767 | 4.406 | 4.948 | 3.352 | 3.532 | 3.676 | 3.683 |
| Energy To Break [J] | 10.624 | 11.42 | 12.004 | 12.713 | 12.517 | 12.679 | 12.748 | 12.61 | 11.949 | 12.456 | 12.311 | 13.12 |
| Stress At Break [MPa] | 9.406 | 9.958 | 9.822 | 9.983 | 9.829 | 10.149 | 9.733 | 9.837 | 9.738 | 9.516 | 9.278 | 8.683 |
| % Strain At Break [%] | 820.6 | 786.83 | 801.79 | 815.45 | 793.07 | 780.84 | 781.34 | 740.66 | 834.2 | 813.54 | 829.82 | 887.08 |

Permeability

| Sample | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|
| Oxygen Permeability Coefficient, [(mm) · (cc)/m² · day · mmHg] | 0.276 | 0.239 | 0.260 | 0.256 | 0.268 | NA | 0.266 | 0.263 | 0.257 | 0.254 | 0.251 | 0.246 |

TABLE 4

Compound Formulations and Properties

| Sample | 1-1 | 1-13 | 1-14 | 1-15 |
|---|---|---|---|---|
| Components (phr) | | | | |
| N660 | 60 | 60 | 60 | 60 |
| CALSOL ™ 810 | 8 | 8 | 8 | 8 |
| STRUKTOL ™ 40 MS | 7 | 7 | 7 | 7 |
| steric acid | 1 | 1 | 1 | 1 |
| ESCOREZ ™ 1102 | 4 | 4 | 4 | 4 |
| magnesium oxide | 0.15 | 0.15 | 0.15 | 0.15 |
| Butyl polymer A | 100 | 10 | 20 | 30 |
| Butyl polymer D | | 90 | 80 | 70 |
| Pass #1 Total phr | 180.15 | 180.2 | 180.15 | 180.15 |
| zinc oxide | 1 | 1 | 1 | 1 |
| ALTAX ™ | 1.25 | 1.25 | 1.25 | 1.25 |
| Sulfur | 0.5 | 0.5 | 0.5 | 0.5 |
| Total phr | 182.9 | 182.9 | 182.9 | 182.9 |
| Mooney ML(1 + 8) on MV2000E, ASTM 1646-17 | | | | |
| Test temp [° C.] | 100 | 100 | 100 | 100 |
| Test time [min] | 8 | 8 | 8 | 8 |
| Preheat [min] | 1 | 1 | 1 | 1 |
| Init [MU] | 72 | 80.6 | 81.4 | 73 |
| Mm [MU] | 56.6 | 56.2 | 56.5 | 53.5 |
| tMm [min] | 7.8 | 7 | 7.3 | 7.7 |
| Visc@4 [MU] | 57.4 | 57 | 57.1 | 54 |
| Visc@8 [MU] | 56.6 | 56.2 | 56.5 | 53.5 |
| Mooney Scorch on MV2000E, ASTM 1646-17 | | | | |
| Test temp [° C.] | 135 | 135 | 135 | 135 |
| Test time [min] | 60 | 60 | 60 | 60 |
| Preheat [min] | 1 | 1 | 1 | 1 |
| Mm [MU] | 21.1 | 19.6 | 20.1 | 18.9 |
| tMm [min] | 5.7 | 5.5 | 6.0 | 5.9 |
| t1 [min] | 14.1 | 19.4 | 20.1 | 21.7 |
| t2 [min] | 19.8 | 33.7 | 32.3 | 32.2 |
| t3 [min] | 23.0 | 42.9 | 39.8 | 38.6 |
| t5 [min] | 27.0 | 53.1 | 48.6 | 46.2 |
| Curerate 1 | 0.2 | 0.1 | 0.1 | 0.1 |
| MDR, ASTM 5289-17 | | | | |
| Test Time [min] | 30 | 30 | 30 | 30 |
| Test Temp [° C.] | 180 | 180 | 180 | 180 |
| Osc. angle [Deg.] | 0.5 | 0.5 | 0.5 | 0.5 |
| ML [dNm] | 1.2 | 1.0 | 1.0 | 1.0 |
| MH [dNm] | 5.2 | 5.8 | 6.0 | 6.0 |
| MH-ML [dNm] | 4.0 | 4.8 | 5.0 | 5.0 |
| t10 [min] | 1.0 | 1.9 | 1.7 | 1.7 |
| t50 [min] | 2.2 | 3.9 | 3.8 | 3.7 |
| t90 [min] | 4.0 | 7.4 | 9.9 | 6.5 |
| PeakRate [dNm/min] | 1.6 | 1.2 | 1.3 | 1.3 |
| Green Strength | | | | |
| 100Modulus [MPa] | 0.29 | 0.35 | 0.35 | 0.34 |
| PeakLoad [N] | 11.2 | 12.6 | 11.9 | 11.2 |
| PeakStress [MPa] | 0.30 | 0.35 | 0.36 | 0.34 |
| StrnAtPeak [%] | 62.5 | 66.6 | 76.2 | 73.7 |
| Ld@100Str [N] | 10.8 | 12.2 | 11.6 | 10.9 |
| Strs@ StrnEnd [MPa] | 0.29 | 0.35 | 0.35 | 0.34 |
| StrTime75 [min] | 8.5 | 5.7 | 5.0 | 6.6 |
| TimeTo75 [min] | 7.6 | 5.5 | 4.8 | 5.4 |
| Hardness Shore A (Zwick) ASTM 2240-15e1 Aged 3.0 days/125° C./Cured @ 175° C. | | | | |
| Test Delay (3 sec) [sec] | 3 | 3 | 3 | 3 |
| Test Temp. [° C.] | 23 | 23 | 23 | 23 |
| Hardness A [Shore A] | 49 | 58 | 59 | 59 |
| Hardness Shore A (Zwick) ASTM 2240-15e1 Cured @ 175° C. | | | | |
| Test Delay (3 sec) [sec] | 3 | 3 | 3 | 3 |
| Test Temp. [° C.] | 23 | 23 | 23 | 23 |
| Hardness A [Shore A] | 42 | 47 | 48 | 48 |
| Hardness Shore A (Zwick) ASTM 2240-15e1 Aged 3.0 days/125° C./Cured @ 160° C. | | | | |
| Test Delay (3 sec) [sec] | 3 | 3 | 3 | 3 |
| Test Temp. [° C.] | 23 | 23 | 23 | 23 |
| Hardness A [Shore A] | 53 | 54 | 52 | 50 |
| Hardness Shore A (Zwick) ASTM 2240-15e1 Cured @ 160° C. | | | | |
| Test Delay (3 sec) [sec] | 3 | 3 | 3 | 3 |
| Test Temp. [° C.] | 23 | 23 | 23 | 23 |
| Hardness A [Shore A] | 45 | 50 | 49 | 48 |
| Tensile 1000 Test ASTM D412-16 Aged 3.0 days/125° C. Cured @ 160° C. @ t90 × 1.4 | | | | |
| 100Modulus [MPa] | 2.6 | 3.3 | 3.3 | 3.0 |
| 300Modulus [MPa] | 7.3 | 8.1 | 8.4 | 8.0 |
| EnergyToBreak [J] | 7.7 | 9.3 | 8.2 | 8.4 |
| StressAtBreak [MPa] | 8.9 | 10.1 | 10.2 | 10.0 |
| % StrainAtBreak [%] | 445 | 481 | 437 | 458 |
| Unaged Tensile 1000 Test ASTM D412-16 Cured @ 160° C. × 1.4 | | | | |
| 100Modulus [MPa] | 1.3 | 1.7 | 1.9 | 1.7 |
| 300Modulus [MPa] | 4.9 | 5.2 | 5.7 | 5.5 |
| EnergyToBreak [J] | 10.1 | 11.8 | 9.9 | 9.8 |
| Stress AtBreak [MPa] | 10.0 | 9.2 | 9.2 | 9.3 |
| % StrainAtBreak [%] | 616 | 700 | 610 | 614 |
| Aged Tensile 1000 Test ASTM D412-16 Aged 3.0 days/125° C. Cured @ 175° C. @ t90 × 1.4 | | | | |
| 100Modulus [MPa] | 2.3 | 2.9 | 2.9 | 2.8 |
| 300Modulus [MPa] | 6.5 | 8.2 | 7.9 | 7.5 |
| EnergyToBreak [J] | 6.5 | 9.9 | 10.3 | 9.8 |
| StressAtBreak [MPa] | 8.0 | 9.7 | 9.8 | 9.7 |
| % StrainAtBreak [%] | 451 | 509 | 500 | 504 |
| Unaged Tensile 1000 Test ASTM D412-16 Cured @ 175° C. × 1.4 | | | | |
| 100Modulus [MPa] | 1.1 | 1.6 | 1.6 | 1.6 |
| 300Modulus [MPa] | 4.2 | 5.1 | 5.1 | 5.0 |
| EnergyToBreak [J] | 9.6 | 9.7 | 11.4 | 11.3 |
| Stress AtBreak [MPa] | 9.5 | 8.6 | 9.2 | 9.2 |
| % StrainAtBreak [%] | 637 | 596 | 660 | 670 |
| Permeability Permeability (mm) · (cc)/[m² · day · mmHg] | 0.263 | NA | 0.232 | 0.240 |

All priority documents are herein fully incorporated by reference for all jurisdictions in which such incorporation is permitted. Further, all documents cited herein, including testing procedures, are herein fully incorporated by reference for all jurisdictions in which such incorporation is permitted.

The invention claimed is:
1. A composition comprising:
about 70 parts per hundred parts rubber (phr) to about 90 phr of a halobutyl rubber; and
about 10 phr to about 30 phr of an elastomer composition, wherein the elastomer composition comprises:
a $C_4$ to $C_7$ isoolefin;
a non-halogenated alkylstyrene; and
a halogenated alkylstyrene,
wherein the non-halogenated alkylstyrene and the halogenated alkylstyrene cumulatively are present in the elastomer composition in the amount of about 3 wt % to about 15 wt % based on the elastomer composition; and wherein the halogenated alkylstyrene is present at from 0.1 mol % to 2 mol % relative to the non-halogenated alkylstyrene;

wherein the sum of the phr of the halobutyl rubber and the phr of the elastomer composition is about 100.

2. The composition of claim 1, wherein the elastomer composition further comprises:

a diolefin, wherein the $C_4$ to $C_7$ isoolefin is not the same as the diolefin.

3. The composition of claim 2, wherein the diolefin is isoprene, butadiene, cyclopentadiene, or combinations thereof.

4. The composition of claim 2, wherein the diolefin is present in the elastomer composition in the amount of less than or equal to about 10 wt % based on the elastomer composition.

5. The composition of claim 2, wherein the $C_4$ to $C_7$ isoolefin is halogenated.

6. The composition of claim 1, wherein the $C_4$ to $C_7$ isoolefin is halogenated with bromine.

7. The composition of claim 1, wherein the non-halogenated alkylstyrene is p-methylstyrene.

8. The composition of claim 1, wherein the composition has a glass transition temperature of about −39° C. to about −32° C.

9. The composition of claim 1, wherein the halobutyl rubber is selected from the group consisting of: bromobutyl rubber, chlorobutyl rubber, and combinations thereof.

10. The composition of claim 1, wherein the halobutyl rubber is selected from the group consisting of: brominated isobutylene-isoprene rubber, chlorinated isobutylene-isoprene rubber, brominated isobutylene-co-p-methylstyrene copolymer, and combinations thereof.

11. The composition of claim 1 further comprising:
processing aid;
curative; and
filler.

12. The composition of claim 11, wherein the filler is carbon black and present at about 20 to about 100 phr.

13. The composition of claim 11, wherein the filler is clay and present at about 1 to about 30 phr.

14. A process to make the composition of claim 1, comprising the steps of:
  a. polymerizing, in a first reactor, the $C_4$ to $C_7$ isoolefin, the non-halogenated alkylstyrene, the halogenated alkylstyrene, optionally a diolefin, and optionally a isobutylene-p-methylstyrene;
  b. polymerizing, in a second reactor, monomers of the halobutyl rubber, wherein the monomers comprise isobutylene derived units, isoprene derived units, p-methylstyrene derived units, p-bromomethylstyrene derived units, or a combination thereof;
  c. combining product streams from the first and second reactors to produce a blend; and
  d. optionally combining the blend with a processing aid, a curative, and a filler.

15. A process to make the composition of claim 1, comprising the steps of:
  a. polymerizing, in a first reactor, the $C_4$ to $C_7$ isoolefin, the non-halogenated alkylstyrene, the halogenated alkylstyrene, optionally a diolefin, and optionally a isobutylene-p-methylstyrene to produce the elastomer composition;
  b. polymerizing, in a second reactor, monomers of the halobutyl rubber to produce the halobutyl rubber, wherein the monomers comprise isobutylene derived units, isoprene derived units, p-methylstyrene derived units, p-bromomethylstyrene derived units, or a combination thereof; and
  c. optionally combining the elastomer composition, the halobutyl rubber, optionally a processing aid, optionally a curative, and optionally a filler.

16. An article comprising the composition of claim 1.

17. A tire innerliner comprising the composition of claim 1.

18. A tire comprising the tire innerliner of claim 17.

* * * * *